United States Patent [19]

Cluff

[11] Patent Number: 4,971,118

[45] Date of Patent: Nov. 20, 1990

[54] FUEL ADDITIVE MIXING SYSTEM

[76] Inventor: James R. Cluff, 2765 Vista Umbrosa, Newport Beach, Calif. 92660

[21] Appl. No.: 384,280

[22] Filed: Jul. 21, 1989

[51] Int. Cl.[5] .......................... B67D 5/04; G05D 11/00

[52] U.S. Cl. .......................................... 141/103; 141/98; 141/105; 141/362; 141/392; 137/98; 137/114; 123/1 A; 222/57

[58] Field of Search ................. 141/100, 103, 105–107, 141/301, 309, 310, 351, 360-362, 382, 9, 98, 392; 137/98, 114, 499, 576; 251/259; 123/1 A, 73 AD, 198 A; 222/57, 59

[56] References Cited

U.S. PATENT DOCUMENTS

| | | | |
|---|---|---|---|
| 1,937,582 | 12/1933 | Murray | 137/114 |
| 2,214,708 | 9/1940 | Mayne et al. | 141/5 |
| 2,581,748 | 1/1952 | Blum | 137/499 |
| 2,826,211 | 3/1958 | Reed | 137/98 |
| 2,935,057 | 5/1960 | Perlewitz | 123/73 A |
| 3,047,003 | 7/1962 | Gurney | 137/114 |
| 3,291,165 | 12/1966 | Fraylick | 141/392 X |
| 3,422,834 | 1/1969 | Garabello | 137/114 |
| 3,642,171 | 2/1972 | Ernst | 222/59 |
| 4,069,835 | 1/1978 | Stadler | 137/114 |
| 4,185,653 | 1/1980 | Armstrong et al. | 137/114 |
| 4,300,699 | 11/1981 | Anhegger | 141/392 X |
| 4,402,351 | 9/1983 | Nomura et al. | 141/98 |
| 4,714,087 | 12/1987 | Jones | 137/3 |
| 4,874,020 | 10/1989 | Bucci | 141/286 X |
| 4,877,146 | 10/1989 | Harris | 141/286 X |

FOREIGN PATENT DOCUMENTS

| | | | |
|---|---|---|---|
| 1095691 | 12/1960 | Fed. Rep. of Germany | 123/73 AD |

*Primary Examiner*—Henry J. Recla
*Assistant Examiner*—Casey Jacyna
*Attorney, Agent, or Firm*—Klein & Szekeres

[57] ABSTRACT

A system for metering a fuel additive into a flow of fuel into a fuel tank includes a mixing unit coupled to the filler neck of the fuel tank. The mixing unit has a body with an axial main flow passage, having a fuel inlet and a mixture outlet. The fuel inlet is dimensioned to receive the standard nozzle found on conventional service station pumps for motor fuel. The body also has an additive inlet that communicates with the main flow passage through a metering passage controlled by a metering valve. The metering valve is actuated by a pivot arm having a first end that is in the flow path of fuel flowing through the main flow passage and a second end that engages one end of a pushrod, the other end of which engages a valving element in the metering valve. The flow of fuel against the first end of the pivot arm causes the pivot arm to pivot so as to push the pushrod against the valving element to move the valving element away from its seat, against the force of a biasing spring, to open the metering valve. The metering valve is thus opened in proportion to the flow of fuel througth the main flow passage. The bias applied by the spring to the valving element can be varied to change the proportional relationship between the metering valve opening and the flow of fuel.

19 Claims, 3 Drawing Sheets

FUEL ADDITIVE MIXING SYSTEM

BACKGROUND OF THE INVENTION

This invention relates broadly to the field of systems and methods for metering the flow of a first liquid into the flow of a second liquid. More particularly, it relates to a system, including a novel metering valve, for metering the flow of a fuel additive into the flow of fuel into a fuel tank.

Concerns for increased fuel economy and reduced exhaust emissions have led to an increased demand for motor vehicle fuel additives that achieve one or both of these ends. In the past, such additives were simply poured into the fuel tank of the vehicle during refueling, with little concern for precise proportions of additive and fuel.

Recent advancements in fuel additive technology have led to new fuel additives that provide significantly improved mileage and emissions control, but which require fairly precise proportions of the fuel and additive mixture for cost effectiveness. Thus, if the additive-to-fuel ratio is too low, the benefits of the additive are not fully realized; if the ratio is too high, the excessive additive provides no additional benefit, and is, therefore, wasted. One particular fuel additive of this type that has recently been developed for gasoline and diesel engines is marketed by Wynn's International, Inc., of Fullerton, Calif., under the trademark "EMISSION CONTROL". Such a product is described in U.S Pat. No. 4,684,373.

It will readily be appreciated that pouring a container of such an additive into the fuel tank during refueling cannot provide any meaningful control over the additive-to-fuel ratio, unless the additive is added only when the tank is substantially empty. Such a regimen is impractical, for obvious reasons, when dealing with motor vehicles.

Accordingly, a mechanism is needed to mix the additive into the fuel so as to achieve and maintain the proper additive-to-fuel ratio, regardless of the amount of fuel in the fuel tank.

The problem of metering an additive liquid into a principal liquid so as to achieve and maintain a constant proportion between the two liquids has been addressed in a number of ways in the prior art. For example, this problem has arisen in the context of adding motor oil to gasoline in a two-stroke internal combustion engine. U. S. Pat. No. 4,069,835 to Stadler illustrates one approach to this specific problem. The Stadler reference discloses a device that attaches to a fuel tank, and that comprises an oil container with a piston valve at the bottom. The valve is operatively connected to a lever in a fuel inlet conduit situated adjacent to the oil container. The flow of fuel through the conduit pivots the lever, thereby opening the valve to allow oil to flow, by gravity, into a mixing chamber to mix with the fuel that has passed through the conduit. The valve is operated so that the flow rate of the oil is proportional to the flow rate of the fuel. U.S. Pat. No. 2,935,057 to Perlewitz discloses a device that uses pressure from the crankcase of the engine to force oil and fuel to flow from separate chambers into a mixing chamber, the proportion of oil to fuel being set by the relative diameters of the conduits that conduct the oil and fuel, respectively, into the mixing chamber.

Neither of the above-described devices is readily adjustable to accommodate additives of differing viscosities. Moreover, the Stadler device requires installation and removal during each refueling operation, while the Perlewitz device requires some engine modification, and is, therefore, not well-suited for use as an add-on accessory for existing engines.

Another approach is exemplified in U.S. Pat. No. 4,714,087 to Jones, which discloses an apparatus that uses pressurized fuel oil, from the high pressure, downstream side of a fuel pump, to aspirate an additive into the fuel oil supply conduit on the upstream side of the pump. This apparatus is specifically adapted for the delivery of additive-enhance heating fuel from a supply truck to a stationary storage tank. U.S. Pat. No. 2,826,211 to Reed discloses a system for injecting an additive into a fuel stream while the fuel is flowing from one receptacle to another. The Reed system is a fixed installation, not adaptable to installation on board a motor vehicle. It can be appreciated that the prior art has not adequately addressed the need for a system, easily installed in an existing motor vehicle, that allows an additive to be mixed with fuel in precise and repeatable proportions, regardless of how much fuel is in the fuel tank of the vehicle. Such a system must be able to accommodate additives of different viscosities, and it must allow the mixing hardware, as well as the additive supply, to be carried on the vehicle, so that the vehicle is not dependent upon the existence of either an additive supply or the mixing hardware at each filling station. Such a system should also be quick and easy to use, with a minimum of skill on the part of the operator. Finally, such a system should be economical to manufacture, install, and use, and yet be sufficiently rugged and durable to withstand long-term use in a motor vehicle.

SUMMARY OF THE INVENTION

Briefly, the present invention is a system for mixing a fuel additive with a motor fuel in a pre-selected additive-to fuel ratio, comprising an additive storage tank mountable on a motor vehicle body, a mixing unit installed in the filler neck of the vehicle's fuel tank, and means for conducting a pressurized flow of additive from the additive tank to the mixing unit. The mixing unit has a fuel inlet, an additive inlet, an outlet communicating with the interior of the fuel tank, and metering valving means for permitting a flow of additive from the additive inlet to the outlet that is proportional to the flow of fuel out of the outlet. The metering valving means are calibrated so that the proportion of additive flow to fuel flow results in a fixed, pre-selected additive-to fuel ratio in the mixture emerging from the outlet. Means are advantageously provided to adjust the calibration means to change the additive-to-fuel ratio, and to accommodate additives of different viscosities.

More particularly, the novel mixing unit of the present invention comprises an essentially tubular body with an annular fitting at the top for removable attachment to the fuel tank filler neck. The body is dimensioned to fit within the filler neck, with a fuel inlet at the top and an outlet at the bottom, connected by an axial main flow passage.

An additive flow passage provides fluid communication between a radially-disposed additive inlet near the top of the body and the outlet. A metering valve is disposed within the additive flow passage so as to control the flow of additive through the passage. The metering valve includes a springloaded valving element that is biased to close against a valve seat. The downstream end of the valving element rests against one end of a pushrod that is journaled within the mixing unit body for axial reciprocation. The other end of the pushrod rests against one end of a pivot arm that is mounted in the mixing unit body so as to pivot in a plane that includes the axis of the mixing unit body. The other end of the pivot arm carries a blade that is disposed near the mixing unit outlet.

In operation, the additive is pumped by the additive pump from the additive tank to the additive inlet in the mixing unit, from which it flows to the upstream side of the metering valve, which is closed. When fuel is caused to flow through the main flow passage (from a service station fuel pump nozzle, for example), the flowing fuel strikes the blade of the pivot arm, causing the blade-carrying end of the arm to pivot downwardly (toward the outlet). The other end of the arm is thus pivoted upwardly, thereby pushing the pushrod against the valving member, urging the latter away from its seat to open the metering valve. Additive is thereby allowed to flow through the additive passage to mix with the fuel near the outlet end of the main flow passage.

The metering valve is opened in proportion to the force of the fuel striking the blade of the pivot arm. Thus, the greater the flow of fuel (assuming no change in the pressure of the fuel flow), the greater the flow of additive. By keeping the flow of additive and the flow of fuel in a fixed proportion, a constant, pre-selected additive-to-fuel ratio can be obtained in the mixture emerging from the mixing unit outlet.

The spring constant of the spring that biases the valving element of the metering valve can be adjusted by means such as a tension-adjustment screw. By changing this spring constant, the force needed to open the metering valve can be changed. In this manner, the flow rate of the additive in relation to the flow rate of fuel can be changed, thereby changing the ratio of additive to fuel in the mixture. This adjustment can also be used to accommodate additives of different viscosities; a more viscous additive would need a greater degree of metering valve opening per unit of fuel flow rate to achieve the same additive-to-fuel ratio as a less viscous additive.

As will be more fully appreciated from the detailed description that follows, the present invention offers several significant advantages not realized in the prior art. Most significantly, it provides a mechanism for precisely metering an additive into a motor fuel so as to achieve and maintain a pre-selected additive-to-fuel ratio, regardless of the amount of fuel already contained in, or being added to, the fuel tank of a motor vehicle. This function is accomplished with a system that can be readily retrofitted onto an existing vehicle. The invention is adjustable for different additive-to-fuel ratios and for different additive viscosities. The invention allows the vehicle to carry the entire mixing apparatus, including its own supply of additive, thereby freeing the vehicle from dependency on the existence of additive supplies or mixing apparatus at service stations. In addition, the invention is economical to manufacture, easy to install and maintain, and sufficiently durable to withstand extended use under the adverse conditions associated with, for example, long haul trucks (for which the invention is especially well-suited). Moreover, the invention provides quick, easy, and precise mixing of additive and fuel substantially automatically, without the need for special skills on the part of those engaged in the refueling operation.

DETAILED DESCRIPTION OF A PREFERRED EMBODIMENT

Figure 1:
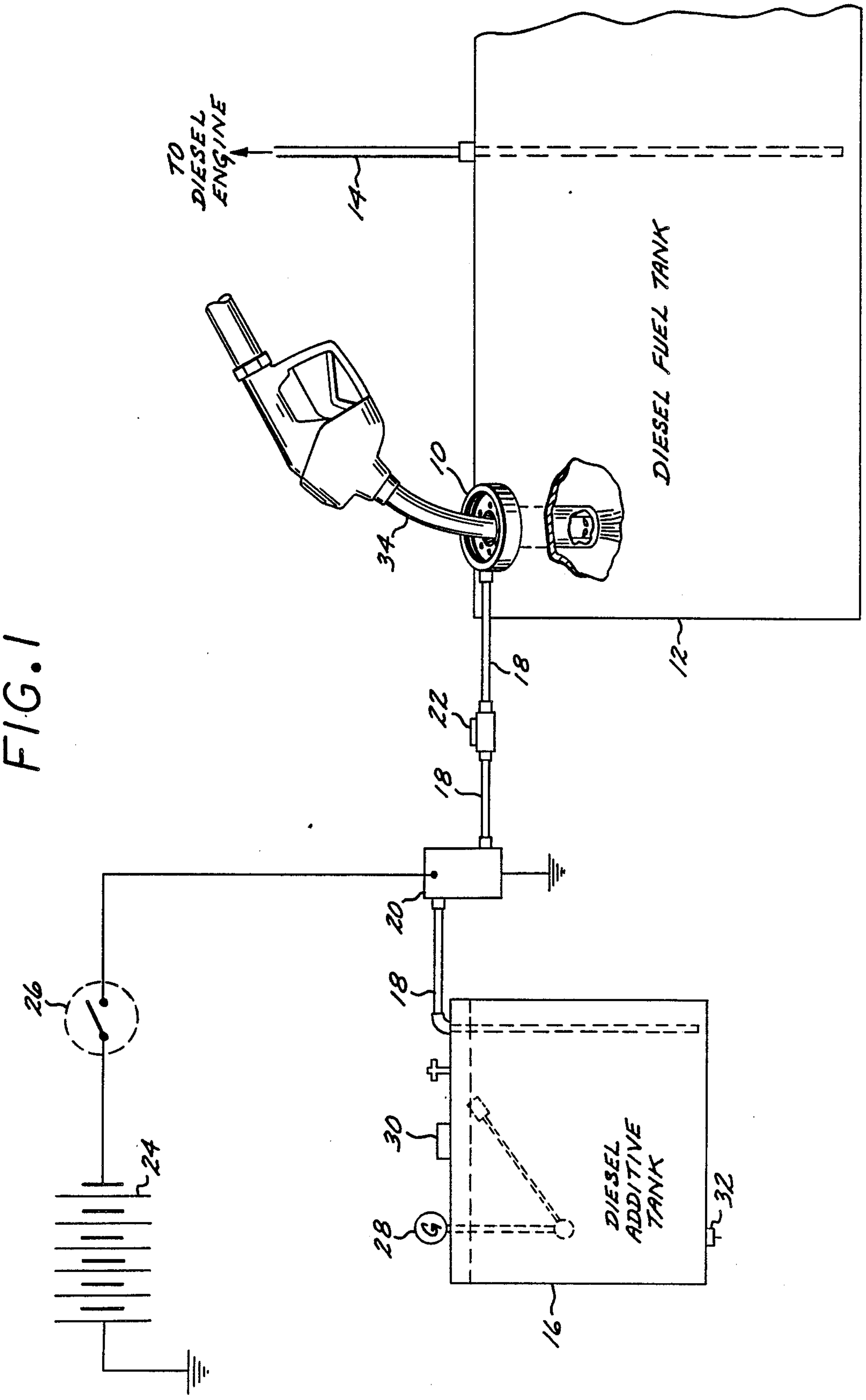
FIG. 1 is a semi-schematic view of a fuel additive mixing system in accordance with a preferred embodiment of the present invention.

Referring first to FIG. 1, a fuel additive mixing system, in accordance with a preferred embodiment of the invention, is shown semi-schematically. As shown, the invention is used to mix diesel fuel with a diesel fuel additive in a fixed, pre-determined additive-to-fuel ratio. It should be understood that the invention can be used to mix a wide variety of additives with any other liquid motor fuel, such as gasoline.

Central to the mixing system is a novel mixing unit 10, shown installed in a diesel fuel tank 12, of the type commonly found on many diesel trucks. The fuel tank 12 has a fuel outlet line 14 leading to the engine in the conventional manner.

The mixing unit 10 (to be described in detail below) receives a fuel additive from a fuel additive tank 16 through an additive feed conduit 18, in which are installed an electric pump 20 and a pressure regulator 22, downstream from the pump. The pump 20 is powered by a battery 24, which may conveniently be the 12 volt battery normally used in the vehicle. The pump is selectively actuated by closing a switch 26, which is preferably a water-proof, explosion-proof switch, located on the mounting brackets (not shown) which mount the additive tank to the vehicle. The additive tank 16 is advantageously provided with a gauge 28 to indicate the level of additive in the tank. The gauge is preferably the magnetic type, with an indicator located on the additive tank itself. The additive tank 16 is also provided with a filler neck 30, with a non-venting cap (not shown), a drain plug 32, and appropriate safety venting.

As will be described more fully below, the mixing unit 10 is configured and dimensioned internally to receive a standard fuel pump nozzle 34, of the type used with conventional diesel fuel and gasoline pumps found in service stations.

The novel mixing unit 10 used in the present invention is illustrated in FIGS. 2 through 9. The unit comprises a hollow cylindrical body 40, the upper portion of which is extended radially outwardly to form an integral annular flange 42 For ease of manufacture and assembly, the body 40 can be made in three parts: an upper, or main portion 44 (which includes the flange 42); a middle portion 46; and a bottom end piece 48, which functions as a retaining ring. The three body pieces 44, 46, and 48 are advantageously held together by a plurality of retaining screws 50, or equivalent fastening means The body 40 is preferably made from a durable, corrosion-resistant metal, such as aluminum or stainless steel. The metal may be machined or cast to form the body portions The body 40 has a central axial bore 52, which forms a main flow passage. The upper portion of the axial bore 52 gradually widens toward the top of the body to form a funnel-shaped fuel inlet 54. The bottom end of the axial bore forms a mixture outlet 56.

Figure 4:
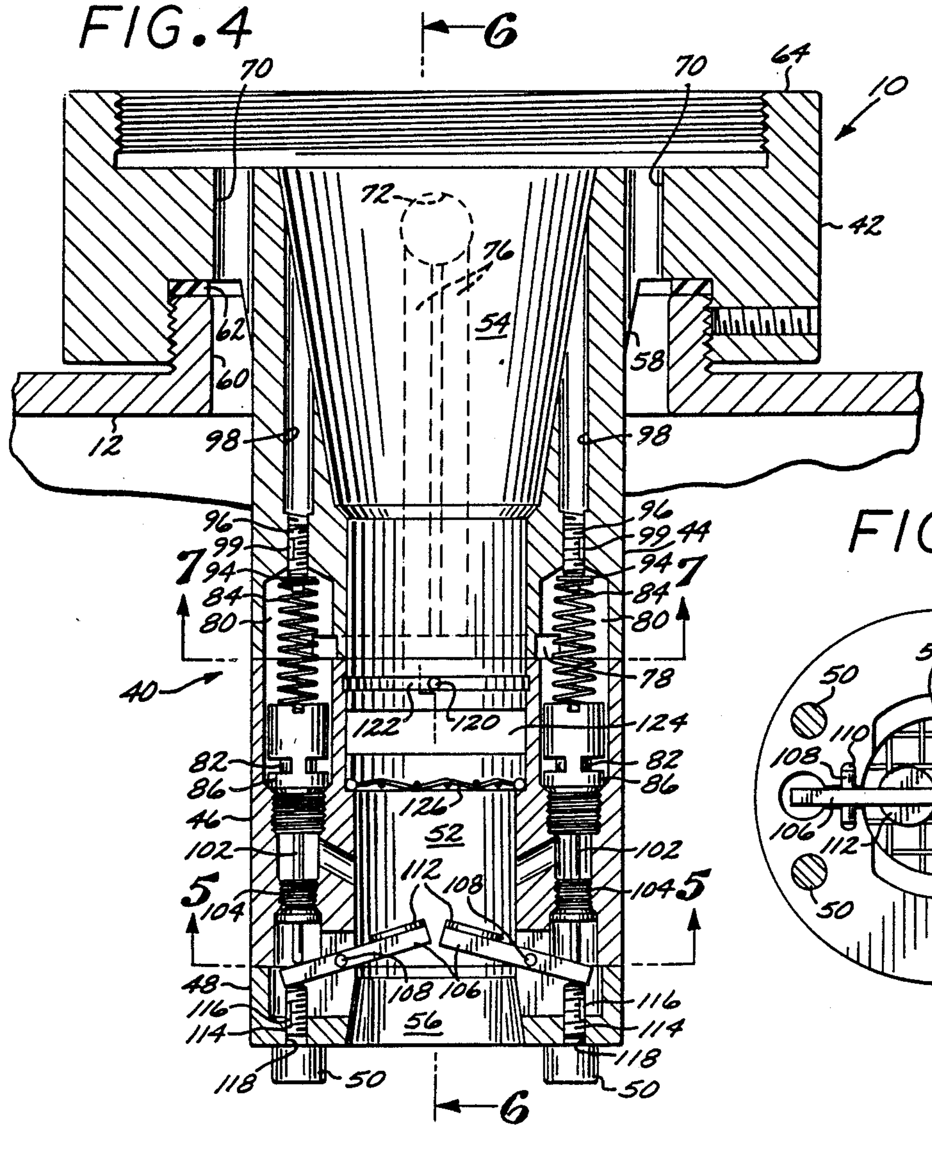
FIG. 4 is a longitudinal cross-sectional view, taken along line 4—4 of FIG. 2.
Figure 6:
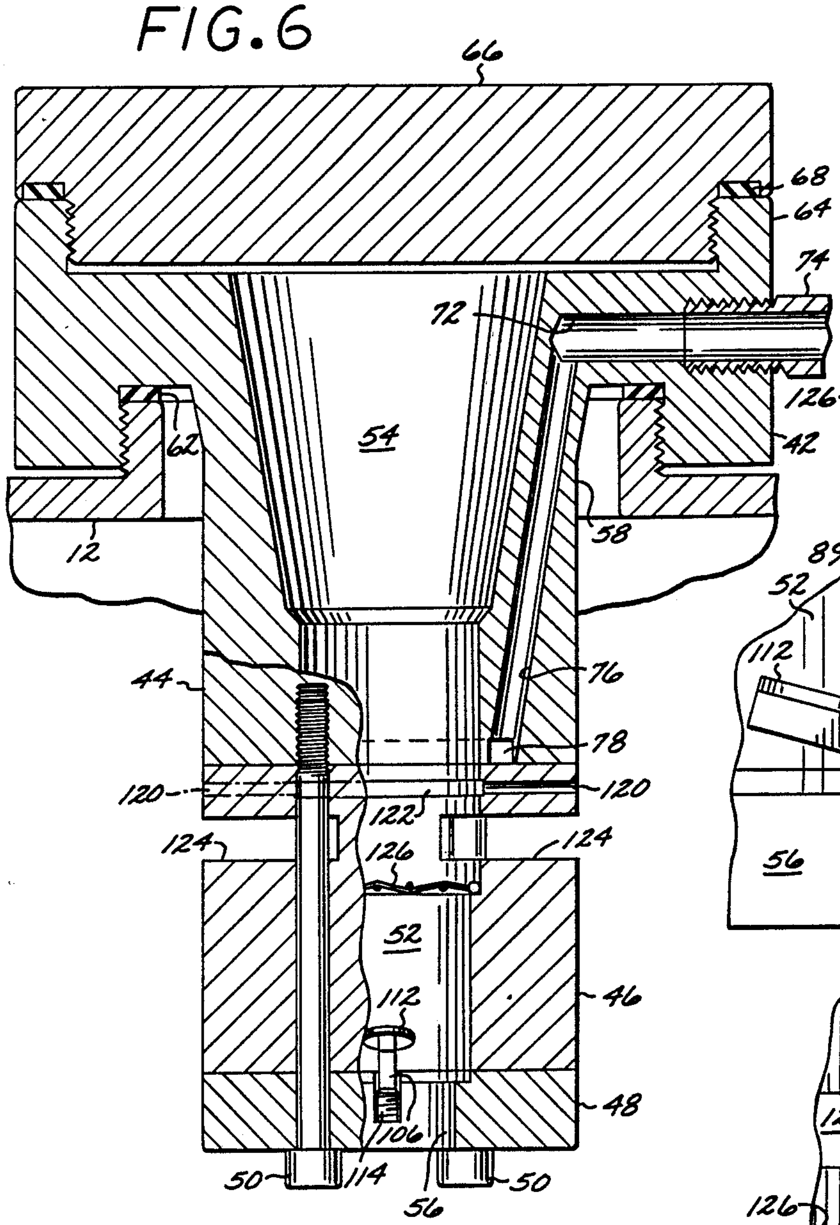
FIG. 6 is a longitudinal cross-sectional view, taken along line 6—6 of FIG. 4, with a portion broken away to show a fastening screw, and showing a removable cap on the mixing unit.
Figure 7:
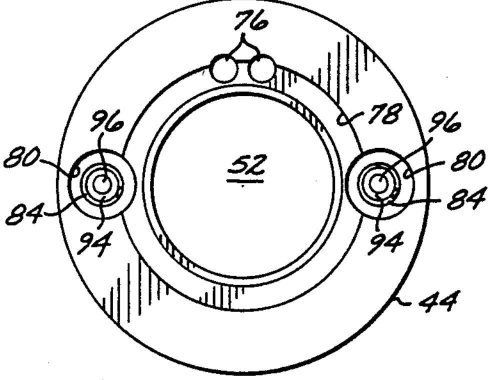
FIG. 7 is a lateral cross-sectional view, taken along line 7—7 of FIG. 4.
Figure 8:
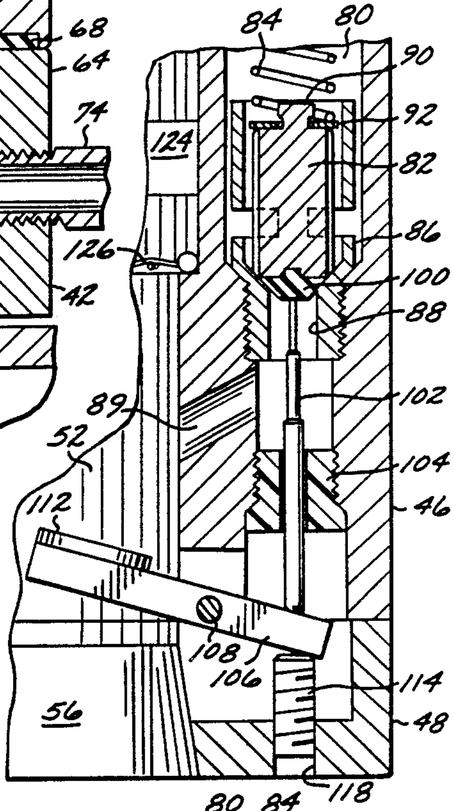
FIG. 8 is a detailed, longitudinal cross-sectional view of a metering valve contained in the mixing unit of FIGS. 2 through, 7, showing the valve in its closed position.
Figure 9:
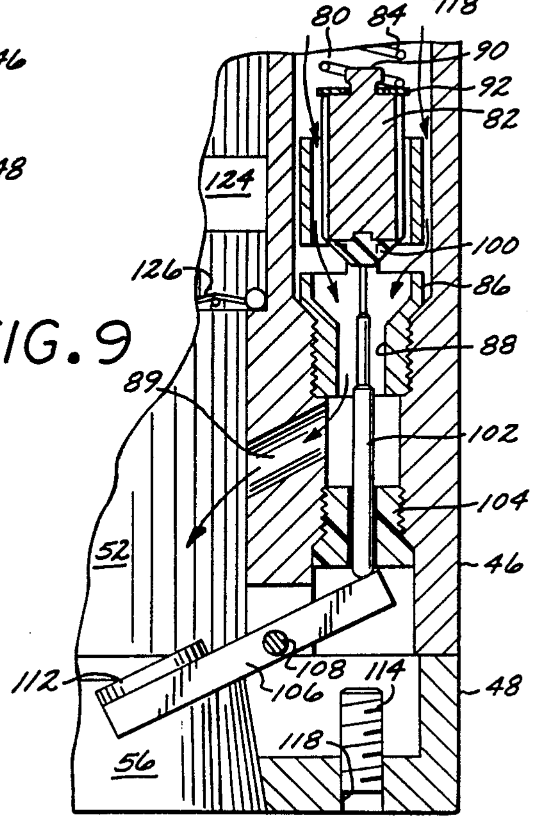
FIG. 9 is a view similar to that of FIG. 8, but showing the valve in its open position.

An annular, upwardly-directed channel or recess 58 is provided in the bottom of the flange 42, adjacent to the cylindrical wall of the main body portion 44, as best shown in FIGS. 4 and 6. The recess 58 is dimensioned to receive a standard-sized fuel tank filler neck 60, which typically is externally threaded to receive an internally-threaded filler cap (not shown), which the mixing unit 10 replaces. To this end, the recess 58 has its radially outer surface internally threaded for removable attachment to the filler neck 60. Fluid-tight sealing between the filler neck 60 and the flange 42 is provided by an annular gasket or washer 62 seated in the recess 58.

The above-described structure can be modified for installation in other types of filler necks. For example, if the filler neck is internally threaded, the body of the mixing unit can be provided with external threads below the flange 42. Alternatively, for filler necks with clamp-type closures, the body can be provided with a compatible clamping mechanism. In any case, the design of the main body portion 44, and particularly its means for attachment to the filler neck, is such as to maintain the structural integrity of the filler neck.

Figure 2:
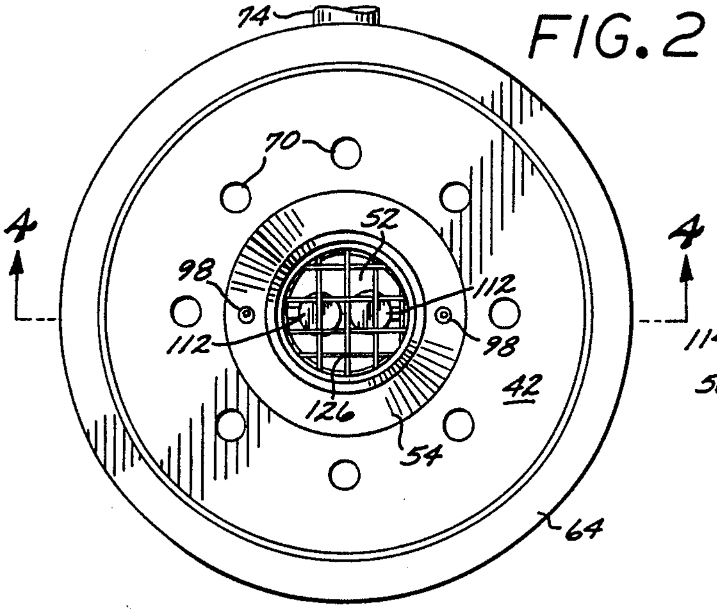
FIG. 2 is a top plan view of a mixing unit used in a preferred embodiment of the present invention.
Figure 3:
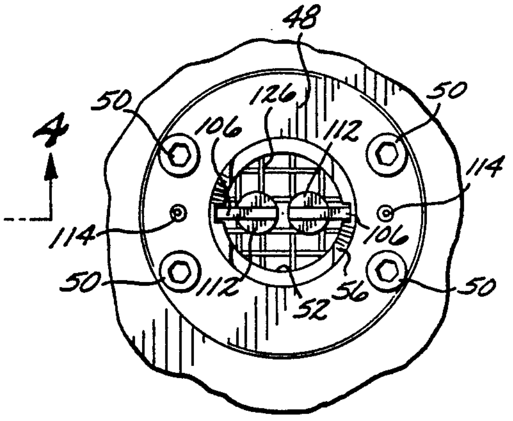
FIG. 3 is a partial bottom plan view of the mixing unit of FIG. 2, showing the outlet end of the mixing unit.

The top of the flange 42 has an upwardly-extending peripheral rim 64 that is internally-threaded to receive an externally-threaded closure or cap 66 (FIG. 6). An annular washer or gasket 68 is advantageously seated in an annular recess in the underside of the cap 66, where it abuts against the top of the rim 64, to provide a more fluid-tight seal between the cap and the rim. As shown in FIGS. 2 and 4, the flange 42 has a plurality of vent holes 70 arranged circumferentially around the fuel inlet 54 to allow the venting of air and fuel vapors through the filler neck 60 during the refueling process.

As best shown in FIG. 6, the flange 42 is provided with a radially-directed additive inlet port 72 that is internally-threaded to couple with an externally-threaded fitting 74 at the outlet end of the additive line 18. The innermost end of the inlet port 72 communicates with a pair internal additive inlet passages 76 that extend downwardly through the main body section 44, where they open into an annular passage 78 that is concentric with the axial bore 52. The annular passage 78, in turn, communicates with a pair of diametrically-opposed chambers 80, that are oriented substantially parallel to the axial bore 52. The annular passage 78 opens into each of the chambers 80 on the upstream side of a metering valve element 82, disposed in each of the chambers 80 for vertical reciprocation (movement in the axial direction) therein.

Each of the metering valve elements 82 forms a part of an additive metering valve assembly. Each metering valve assembly comprises one of the valve elements 82; a biasing spring 84 engaged against the upstream side of the valving element; a funnel-shaped valve seat 86, against which the downstream end of the valving element 82 is urged by the spring 84; and a metering orifice 88 through the valve seat 86. Each metering orifice 88 communicates with the upstream end of a valve outlet port 89 which passes through the middle body section 46, so that its downstream end enters the lower part of the main flow passage 52. The additive inlet passages 76, the annular passage 78, the chambers 80, and the outlet ports 89 form a metering passage, flow through which is regulated by the normally closed metering valve assemblies.

The upstream side of each valving element has an integral central projection or hub 90 that serves to locate a washer 92, against which the biasing spring 84 is seated. The other end of each biasing spring 84 is seated against a second washer 94 that is carried on the end of a set screw 96. Each set screw 96 is threaded into the main body section 44 so that its threaded end extends into the chamber 80, bearing the second washer 94, and thus setting the compression of the spring 84. The head of each set screw 96 is accessed through an axially-directed set screw bore 98. Each set screw 96 advantageously has a nylon strip 99 to minimize slippage.

The springs 84, the washers 92 and 94, and the set screws 96 are preferably made of stainless steel, for strength, resilience, and corrosion resistance.

Figure 5:
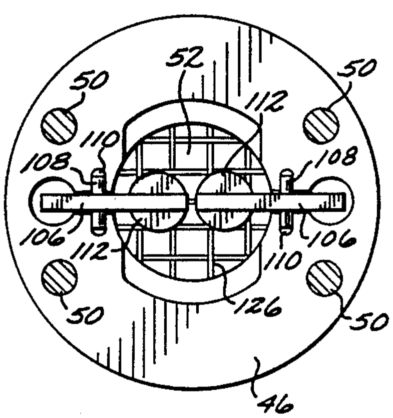
FIG. 5 is a lateral cross-sectional view, taken along line 5—5 of FIG. 4.

The downstream end of each valving element 82 preferably has a tip 100 made of a durable elastomeric material that will not deteriorate with prolonged contact with petrochemical fuels. An example of such a material is a copolymer of vinylidene fluoride sold by DuPont under the trademark "VITON". The use of such a material is advantageous, because it provides a non-slip surface against which the upper end of a valve-actuating pushrod 102 is engaged. The pushrods 102 (one for each valving element 82) are each journaled in a bearing element or bushing 104 for vertical (axial) reciprocation within the valve seat 86 and its outlet orifice 88. The lower end of each pushrod 102 seats against the exterior end of a pivot arm 106. Each pivot arm 106 pivots on a pivot pin 108 that is seated in a socket 110 in the middle body section 46, as best shown in FIG. 5. The interior end of each pivot arm 106 extends into the lower portion of the main flow passage 52 a short distance upstream from the outlet 56, and is provided with a blade 112. The pivot arms 106 are diametrically-opposed, and oriented so as to pivot in a vertical plane that includes the longitudinal axis of the mixing unit. A pair of set screws 114 extending upwardly through the bottom body portion 48 provide stops against which the exterior ends of the pivot arms are urged by the force of the springs 84, acting through the valving elements 82 and the pushrods 102. Each of the set screws 114 preferably has a nylon strip 116 along its threaded portion to minimize slippage. The head of each of the set screws 114 is accessed through an access bore 118 in the bottom body portion 48.

The bushings 104 are preferably made of a non-porous, wear-resistant, low friction material, such as that marketed under the name "Delrin". Material of this type will be lubricated by the additive that coats the pushrods, without soaking up any of the additive. A small amount of the additive will leak through the bushings 104 and onto the ends of the pivot arms abutting the pushrods, from which the additive seeps onto the pivot pins 108 to provide lubrication for the pivot arms 106. It will thus be appreciated that the critical moving parts of the metering valves are constantly lubricated during operation, thereby extending the reliable lifetime of the mixing unit.

The middle body portion 46, just below its juncture with the main body portion 44, is provided with a pair of diametrically-opposed radially-directed vent holes 120, each of which communicates with an annular internal channel 122, formed as a circumferential groove around the main flow passage 52. Just below each of the vent holes 120 is an arcuate slot that forms a splash outlet 124 from the main flow passage 52 to the exterior of the mixing unit body. A short distance below the splash outlets 124, the main flow passage is intersected by a circular screen 126. The screen 126 is preferably formed from a ring of 1/16 inch diameter No. 304 stainless wire, supporting a No. 3 mesh of 0.047 inch diameter wire of the same material. This construction provides a screen structure that is approximately eighty per cent open.

The structure of the mixing system and the mixing unit 10 have now been sufficiently described to make the operation of the system easily understood.

A motor vehicle (not shown) in which the present invention has been installed will have the mixing unit installed in the fuel tank filler neck, as previously described. The additive tank 16 can be mounted, by suitable brackets or the like (not shown), at any convenient place on the vehicle. (For purposes of this description, the vehicle may be considered a diesel-powered truck, but it might also be, for example, a truck, automobile, or boat, using diesel fuel or gasoline.) The additive tank 16 contains a volume of the selected fuel additive.

When the truck pulls into a service station for refueling, the cap 66 is removed from the mixing unit 10, and the additive pump 20 is turned on with the switch 26, thereby delivering a pressurized flow of additive to the additive inlet port 72 of the mixing unit 10. The pressure of the flow is regulated to the desired level by the regulator 22. The service station fuel pump nozzle 34 is inserted into the mixing unit fuel inlet 54, as shown in FIG. 1, and fuel is pumped through the main flow passage 52. The tip of the nozzle extends about to the level of the screen 126, which provides for an even flow of the fuel down the main flow passage 52, while also acting as a barrier to block the entry of unwanted foreign objects (such as, for example, sticks that may be used by some in the trucking business as a crude form of fuel "gauge").

As the fuel flows, it strikes the blades 112 of the pivot arms 106. The metering valve elements 82, which are normally biased to close against the valve seats 86 by the springs 84, are now urged away from the valve seats by the upward motion of the pushrods 102, which results from the pivoting action of the pivot arms 106 when the blades 112 are pushed downwardly by the force of the fuel striking them. The greater the flow of fuel against the blades 112, the greater the pivoting action of the pivot arms 106, and the greater the upward travel of the pushrods 102. The valving members 82, in turn, are pushed farther away from the valve seats 86, thereby opening the metering valves more widely.

When the metering valves are opened, additive is allowed to flow from the chambers 80 (where it has arrived from the additive inlet port 72 via the inlet passages 76 and the annular passage 78), past the valving elements 82, through the metering orifices 88, and out the outlet ports 89 into the main flow passage 52. Upon entering the main flow passage, the additive is mixed with the fuel through the natural turbulence of the fuel flow, and the resulting mixture emerges from the mixture outlet 56 to enter the fuel tank 12.

It will thus be appreciated that the flow of additive is proportional to the flow of fuel, thereby yielding a substantially uniform and constant additive-to-fuel ratio in the mixture supplied to the fuel tank from the mixture outlet 56.

When the fuel flow is shut off, the force on the blades 112 is removed, thereby allowing the force of the springs 84 to urge the valving elements 82 back against the valve seats 86. The metering valves are thus closed, shutting off the flow of additive.

As previously mentioned, the compression of the springs 84 can be adjusted by means of the compression adjustment set screws 96 By increasing the compression of the springs 84, their spring constants are effectively increased, thereby increasing the closing bias applied to the valving elements 82. As a result, the metering valves will be opened less in response to a given flow of fuel, thereby providing a lower additive to fuel ratio. If the spring compression is decreased by means of the set screws 96, the opposite effect is achieved The additive-to-fuel ratio is increased. Similarly, if a different additive is used, having a greater viscosity than the previously-used additive, the valve will have to opened more in relation to a given fuel flow to achieve the same additive-to-fuel ratio. If the viscosity of the new additive is less than that of the previous additive, the valve will have to be opened less. Adjusting the spring compression by means of the set screws 96 will allow this type of adjustment to accommodate varying additive viscosities.

The purpose of the vent holes 120, the annular channel 122, and the splash outlets 124 is dictated by the automatic shut-off mechanism incorporated in the standard fuel delivery nozzles currently in use. Such nozzles typically have an air vent near their outlet. Fuel is allowed to flow out of the nozzle as long as air can enter the vent. When the vent is blocked by the rising fuel level, an automatic mechanism is actuated to shut off the fuel flow. The vent holes 120 and the annular channel 122 in the mixing unit body allow the passage of air from outside of the mixing unit body to the nozzle air vent when the nozzle is inserted into the mixing unit. The annular channel 122 provides the nozzle air vent with access to air from the vent holes 120, regardless of the orientation of the nozzle air vent with respect to the vent holes 120. The splash outlets 124 allow fuel splashing off of the blades 112 to exit from the mixing unit body before reaching the annular channel 122, where splattered fuel droplets could block the flow of air through the nozzle air vent, resulting in premature shut-off.

The set screws 96 can be used to calibrate the metering valves for a selected additive-to-fuel ratio for any desired additive If, for example, an additive-to-fuel ratio of 1/150 is desired for a particular additive, the mixing unit can be calibrated by placing precision flow meters in conduits delivering fuel and additive to the fuel inlet 54 and the additive inlet port 72, respectively, and then adjusting the set screws 96 until the desired ratio is achieved. The fuel flow rates during the calibration procedure would be selected to coincide with the fairly standardized flow rates provided by the typical service station fuel pumps. When the unit has been calibrated to achieve the pre-selected additive-to-fuel ratio, it can be installed in the vehicle as previously described. If a different ratio is desired, or an additive with a different viscosity is selected, the previously-installed mixing unit can easily be replaced with a new unit that has been appropriately calibrated for the new situation.

From the foregoing description, it will be appreciated that the present invention provides many significant advantages. For example, metering of the additive is performed precisely to yield accurate and repeatable additive-to-fuel ratios. This result is achieved in a system that is easily installed in existing vehicles with little or no modification of the vehicle, and no modification of its engine whatsoever. The system is capable of withstanding many thousands of miles of over-the-road use with a minimum of maintenance. The system is entirely self-contained on the vehicle, so that the vehicle is not dependent upon special facilities or equipment at each refueling stop. In addition, the mixing unit is easily adaptable to accommodate a wide variety of additives, with different viscosities, and different additive-to-fuel ratios.

While a preferred embodiment of the invention has been described above, variations and modifications will suggest themselves to those skilled in the pertinent arts. For example, the specific configuration of the internal additive passages is exemplary only, and equivalent structure may be found to accomplish the same results. Likewise, equivalent means to the springs 84, such as elastomeric elements, may be found for biasing the metering valves. If such elastomeric biasing means are used, it may be advantageous to provide for calibration and adjustment by changing the size of the pivot arm blades.

These and other modifications and variations should be considered within the spirit and scope of the invention, as defined in the claims that follow.

What is claimed is:

1. A system for metering a liquid fuel additive into a flow of liquid fuel delivered from a source through a nozzle, comprising:

a first container for holding a volume of the liquid fuel additive;

a second container for holding a mixture of the fuel additive and the fuel, the second container including filler means for admitting the mixture thereinto;

conduit means having a first end communicating with the first container and a second end;

mixing means in the filler means and having a first inlet communicating with the second end of the conduit means, a second inlet for the introduction of a flow of the fuel from the nozzle, the second inlet being dimensioned to receive the nozzle, and a mixture outlet communicating with the filler means, for permitting a flow of the fuel additive from the first inlet to the outlet in a preselected proportional relationship to the flow of the fuel from the second inlet to the mixture outlet;

air passage means for allowing the passage of air from outside the mixing means to the nozzle when the nozzle is received in the second inlet; and means in the conduit means for delivering the fuel additive from the first container to the first inlet at a regulated positive pressure;

wherein the mixing means comprises:

a body having a main flow passage from the second inlet to the mixture outlet;

coupling means on the body for coupling to the filler means so that he mixture outlet and the second container are in fluid a metering passage in the body providing fluid communication between the first inlet and the main flow passage;

valving means in the metering passage for normally closing the metering passage;

valve actuation means in the main flow passage, responsive to the flow of the fuel additive therethrough, for opening the valving means so as to permit a flow of the fuel additive through the metering passage that is in a preselected proportional relationship to the flow of the fuel through the main flow passage; and metering adjustment means, operatively associated with the valving means, for selectively varying the preselected proportional relationship.

2. The system of claim 1, wherein the valving means comprises:

a valving element having an upstream side and a downstream side;

a valve seat forming a flow orifice in the metering passage; and biasing means, engaged against the upstream side of the valving element, for biasing the valving element against the valve seat, thereby closing the flow orifice with the downstream side of the valving element.

3. The system of claim 2, wherein the valve actuation means comprises:

a pushrod having a first end and a second end, the first end engaged against the downstream side of the valving element; and a pivot arm, having a first end and a second end, and mounted in the body so as to be pivotable in a plane that includes the longitudinal axis of the main flow passage, the pivot arm first end being located in the main flow passage within the flow path of the second liquid, the pivot arm second end being engaged against the pushrod second end;

whereby the flow of the fuel against the pivot arm first end pivots the pivot arm so as to move the pushrod axially against the downstream end of the valving element.

4. The system of claim 2, wherein the metering adjustment means includes means for selectively varying the bias applied by the biasing means to the valving element.

5. The system of claim 4, wherein the biasing means includes a spring in compression against the upstream side of the valving element, and wherein the metering adjustment means includes means for selectively varying the compression of the spring.

6. Apparatus for metering a liquid fuel additive from a fuel additive container into a flow of liquid fuel delivered from a source through a nozzle, the apparatus comprising:

a body having an axial main flow passage therethrough, the passage having a fuel inlet and a mixture outlet, the fuel inlet being dimensioned to receive the nozzle;

air passage means for admitting the passage of air from the exterior of the body to the main flow passage when the nozzle is received in the fuel inlet;

an additive inlet in the body communicating with the main flow passage through a metering passage;

fuel additive delivery means for delivering the fuel additive from the fuel additive container to the additive inlet at a regulated positive pressure;

valving means in the metering passage for normally closing the metering passage;

valve actuation means, in the main flow passage, responsive to the flow of fuel therethrough, for opening the valving means so as to permit a flow of additive through the metering passage that is in a preselected proportional relationship to the flow of fuel through the main flow passage; and metering adjustment means, operatively associated with the valving means, for selectively varying the preselected proportional relationship.

7. The apparatus of claim 6, wherein the valving means comprises:

a valving element having an upstream side and a downstream side;

a valve seat forming a flow orifice in the metering passage; and biasing means, engaged against the upstream side of the valving element, for biasing the valving element against the valve seat, thereby closing the flow orifice with the downstream side of the valving element.

8. The apparatus of claim 7, wherein the valve actuation means comprises:

a pushrod having a first end and a second end, the first end engaged against the downstream side of the valving element; and a pivot arm, having a first end and a second end, and mounted in the body so as to be pivotable in a plane that includes the longitudinal axis of the main flow passage, the pivot arm first end being located in the main flow passage within the flow path of the fuel flowing therethrough, the pivot arm second end being engaged against the pushrod second end;

whereby the flow of the fuel against the pivot arm first end pivots the pivot arm so as to move the pushrod axially against the downstream end of the valving element.

9. The apparatus of claim 8, further comprising:

splash outlet means in the body, upstream from the mixture outlet, for providing an outlet from the body for fuel splashing off of the pivot arm first end as the fuel flows through the main flow passage.

10. The apparatus of claim 7 wherein the metering, adjustment means includes means for selectively varying the bias applied by the biasing means to the valving element.

11. The apparatus of claim 10, wherein the biasing means includes a spring in compression against the upstream side of the valving element, and wherein the metering adjustment means includes means for selectively varying the compression of the spring.

12. The apparatus of claim 6, wherein the air passage means comprises:

a radially-directed vent hole through the body; and an annular channel, around the main flow passage, communicating with the vent hole.

13. Apparatus for metering a liquid fuel additive into a flow of liquid fuel delivered from a source through a nozzle into a fuel tank having a filler neck, the apparatus comprising:

a body having an axial main flow passage therethrough, the main flow passage having a fuel inlet and a mixture outlet, the fuel inlet being dimensioned to receive the nozzle;

coupling means on the body for coupling the body to the filler neck so that the mixture outlet is in fluid communication with the fuel tank;

an additive inlet in the body;

a metering passage communicating between the additive inlet and the main flow passage;

valving means in the metering passage for controllably metering the flow of additive from the additive inlet to the main flow passage;

valve actuation means, in the main flow passage, responsive to the flow of fuel therethrough, for opening the valving means proportionately to the flow of fuel through the main flow passage, the valve actuation means including a pivot arm having a first end located in the main flow passage within the flow path of the fuel flowing therethrough and a second end operatively connected to the valving means, the pivot arm being pivoted by the flow of fuel to open the valving means proportionately to the flow of fuel;

air vent means for admitting air from the exterior of the body to the main flow passage between the fuel inlet and the mixture outlet; and splash outlet means in the body upstream from the pivot arm, for providing an outlet from the body for fuel splashing off of the pivot arm first end as the fuel flows through the main flow passage.

14. The apparatus of claim 13, further comprising metering adjustment means, operatively associated with the valving means, for selectively varying the proportional relationship between the opening of the valving means and the flow of fuel through the main flow passage.

15. The apparatus of claim 14, wherein the valving means comprises:

a valving element having an upstream side and a downstream side;

a valve seat forming a flow orifice in the metering passage; and biasing means, engaged against the upstream side of the valving element, for biasing the valving element against the valve seat, thereby closing the flow orifice with the downstream side of the valving element.

16. The apparatus of claim 15, wherein the metering adjustment means includes means for selectively varying the bias applied by the biasing means to the valving element.

17. The apparatus of claim 15, wherein the biasing means includes a spring in compression against the upstream side of the valving element, and wherein the metering adjustment means includes means for selectively varying the compression of the spring.

18. The apparatus of claim 15, wherein the valve actuation means comprises:

a pushrod having a first end and engaged against the downstream side of the valving element and a second end engaged by the second end of the pivot arm;

whereby the flow of fuel against the pivot arm first end pivots the pivot arm so as to move the pushrod axially against the downstream end of the valving element, thereby moving the valving element upstream from the valve seat to open the flow orifice.

19. Apparatus for metering a liquid fuel additive into a flow of liquid fuel delivered from a source through a nozzle, the apparatus comprising:

a body having an axial main flow passage therethrough, the passage having a fuel inlet and a mixture outlet, the fuel inlet being dimensioned to receive the nozzle;

an additive inlet in the body communicating with the main flow passage through a metering passage;

valving means in the metering passage for normally closing the metering passage, the valving means comprising:

a valving element having an upstream side and a downstream side;

a valve seat forming a flow orifice in the metering passage; and biasing means, engaged against the upstream side of the valving element, for biasing the valving element against the valve seat, thereby closing the flow orifice with the downstream side of the valving element;

valve actuation means, in the main flow passage responsive to the flow of fuel therethrough, for opening the valving means so as to permit a flow of additive through the metering passage that is in a preselected proportional relationship to the flow of fuel through the main flow passage, the valve actuation means comprising:

a pushrod having a first end and a second end, the first end engaged against the downstream side of the valving element; and a pivot arm, having a first end and a second end, and mounted in the body so as to be pivotable in a plane that includes the longitudinal axis of the main flow passage, the pivot arm first end being located in the main flow passage within the flow path of the fuel flowing therethrough, the pivot arm second end being engaged against the pushrod second end, whereby the flow of fuel against the pivot arm first end pivots the pivot arm so as to move the pushrod axially against the downstream end of the valving element;

metering adjustment means, operatively associated with the valving means, for selectively varying the preselected proportional relationship; and splash outlet means in the body, upstream from the mixture outlet, for providing an outlet from the body for fuel splashing off of the pivot arm first end as the fuel flows through the main flow passage.

* * * * *

UNITED STATES PATENT AND TRADEMARK OFFICE

CERTIFICATE OF CORRECTION

PATENT NO. : 4,971,118

DATED : November 20, 1990

INVENTOR(S) : James R. Cluff

It is certified that error appears in the above-identified patent and that said Letters Patent is hereby corrected as shown below:

Column 4, line 22, omit the comma after "through";

Column 5, line 7, after "means" insert --.--;

Column 8, line 16, after "96" insert --.--;

Column 8, line 23, after "achieved" insert --.--;

Column 9, line 67 "he" should be -the--;

Column 9, line 68, after "fluid" insert -communication--;

Column 13, line 16, after "passage" insert --,--.

Signed and Sealed this

Fifth Day of October, 1993

Attest:

BRUCE LEHMAN

*Attesting Officer*

*Commissioner of Patents and Trademarks*